(12) United States Patent
Bath et al.

(10) Patent No.: US 12,158,215 B2
(45) Date of Patent: Dec. 3, 2024

(54) MODIFIED BALL VALVE

(71) Applicants: Charanjit Singh Bath, Middlesex (GB); Mustafa Becharef, Middlesex (GB)

(72) Inventors: Charanjit Singh Bath, Middlesex (GB); Mustafa Becharef, Middlesex (GB)

( * ) Notice: Subject to any disclaimer, the term of this patent is extended or adjusted under 35 U.S.C. 154(b) by 0 days.

(21) Appl. No.: 17/636,940

(22) PCT Filed: Jun. 23, 2020

(86) PCT No.: PCT/GB2020/051511
§ 371 (c)(1),
(2) Date: Feb. 21, 2022

(87) PCT Pub. No.: WO2021/032940
PCT Pub. Date: Feb. 25, 2021

(65) Prior Publication Data
US 2022/0364652 A1    Nov. 17, 2022

(30) Foreign Application Priority Data

Aug. 20, 2019 (GB) ..................................... 1911941

(51) Int. Cl.
*F16K 11/087* (2006.01)
*F24D 19/08* (2006.01)
(52) U.S. Cl.
CPC .......... *F16K 11/087* (2013.01); *F24D 19/088* (2013.01)
(58) Field of Classification Search
CPC ............... F16K 11/0876; F16K 5/0647; F16K 11/0873; F24D 19/085–088; F24H 15/32;
(Continued)

(56) References Cited

U.S. PATENT DOCUMENTS 226,213 A * 4/1880 Van Patten ........... F16K 11/087
 137/152
306,168 A * 10/1884 Moseley .................. C02F 1/02
 251/352

(Continued)

FOREIGN PATENT DOCUMENTS

CN     2493793 Y     5/2002
CN     2881250 Y     3/2007

(Continued)

*Primary Examiner* — Craig J Price
(74) *Attorney, Agent, or Firm* — Renner, Kenner, Greive, Bobak, Taylor & Weber

(57) ABSTRACT

A modified valve (10) comprises a body (11) having first (18), second (19), third (21) and fourth (23) connectors. The first (18) and second connectors (19) are each adapted for connection to a respective element of a fluid circulation system. A ball valve member (30) is enclosed internally within the body (11) and is arranged for selective rotation between a range of positions. First (31), second (32) and third (33) apertures are provided in the ball valve member (30) and arranged in a configuration so as selectively to permit fluid communication between at least two of said first (18), second (19) and third (21) connectors in each of said range of positions of the ball valve member (30). The ball valve member (30) further comprises a conduit (35) to permit fluid communication between said fourth connector (23) and at least two of said first (18), second (19) and third (21) connectors in each of said range of positions of the ball valve member (30).

13 Claims, 6 Drawing Sheets

(58) Field of Classification Search
CPC .......... F24H 15/325; Y10T 137/88102; Y10T 137/86863; Y10T 137/86871; Y10T 137/86743; Y10T 137/86638; Y10T 137/86815; Y10T 137/86823; Y10T 137/87249; F01P 3/20; F01P 11/20; F01P 11/04; F01P 2060/18; F02N 19/02; F02N 19/10; F02B 3/06
USPC ......... 251/341, 345, 352; 137/616.7, 625.46, 137/625.47, 625.31, 625.21, 625.4, 137/625.41, 615, 884
See application file for complete search history.

(56) References Cited

U.S. PATENT DOCUMENTS

| | | | | | |
|---|---|---|---|---|---|
| 408,617 | A | * | 8/1889 | Hay | F15B 13/0417 137/357 |
| 487,842 | A | * | 12/1892 | King | F16L 27/0861 239/26 |
| 1,274,103 | A | * | 7/1918 | Story | F16K 1/446 137/240 |
| 1,583,173 | A | * | 5/1926 | Price et al. | E03C 1/0403 251/155 |
| 3,674,052 | A | * | 7/1972 | Hartman | F16K 5/08 137/625.21 |
| 3,721,265 | A | * | 3/1973 | Hoffland | F16K 11/08 251/312 |
| D271,421 | S | * | 11/1983 | Fetterman | D23/233 |
| 4,479,459 | A | * | 10/1984 | Piper | F22B 37/545 251/297 |
| 4,552,334 | A | * | 11/1985 | Tomiyama | F16K 11/0876 137/240 |
| 4,573,498 | A | * | 3/1986 | Ludwig | F16K 11/0876 251/315.12 |
| 4,681,133 | A | * | 7/1987 | Weston | F16K 5/0605 166/86.1 |
| 4,915,133 | A | * | 4/1990 | Harrison | F16K 11/0873 251/315.15 |
| 5,115,837 | A | * | 5/1992 | Tupper | F16K 11/0873 137/590 |
| 6,068,023 | A | * | 5/2000 | Potter | F24F 13/222 137/240 |
| 6,158,467 | A | * | 12/2000 | Loo | A61M 39/223 137/625.19 |
| 6,216,473 | B1 | * | 4/2001 | Arii | F16K 11/085 62/77 |
| 6,425,571 | B1 | * | 7/2002 | Schadewald | F16K 27/067 251/286 |
| 6,675,834 | B1 | * | 1/2004 | Lai | F16K 11/0873 137/864 |
| 7,089,960 | B2 | * | 8/2006 | Maruta | F16K 5/0605 137/625.22 |
| 7,373,953 | B2 | * | 5/2008 | Minnick | F16K 11/0873 138/30 |
| 7,771,383 | B2 | * | 8/2010 | Truitt | A61M 39/26 604/32 |
| 7,828,012 | B2 | * | 11/2010 | Hegberg | F16K 11/087 251/315.1 |
| 8,584,701 | B2 | * | 11/2013 | Duncan | A61M 39/223 116/277 |
| 9,074,690 | B2 | * | 7/2015 | Winterholler | F16K 5/0647 |
| 9,863,545 | B2 | * | 1/2018 | Kawamura | A47L 7/0057 |
| 10,458,662 | B2 | * | 10/2019 | Olsen | F24D 19/08 |
| 10,533,485 | B2 | * | 1/2020 | Carter | F01P 11/20 |
| 11,168,797 | B2 | * | 11/2021 | Dragojlov | F16K 31/535 |
| 11,852,263 | B2 | * | 12/2023 | Geng | F16K 11/0876 |
| 2010/0193043 | A1 | * | 8/2010 | Erhardt | F24H 9/13 137/215 |
| 2010/0230624 | A1 | * | 9/2010 | Tejamo | F16K 5/201 251/315.16 |
| 2011/0071390 | A1 | * | 3/2011 | Liu | A61B 6/504 600/431 |
| 2018/0030881 | A1 | * | 2/2018 | Carter | F02N 19/10 |
| 2018/0259076 | A1 | * | 9/2018 | Feng | F24D 19/1024 |
| 2019/0024907 | A1 | | 1/2019 | Bath et al. | |
| 2022/0364653 | A1 | * | 11/2022 | Plaeru | F16K 27/067 |

FOREIGN PATENT DOCUMENTS

| | | |
|---|---|---|
| GB | 2546322 A | 7/2017 |
| GB | 2548204 A | 9/2017 |
| GB | 2561764 A | 10/2018 |
| WO | 2005/010415 A1 | 2/2005 |
| WO | 2017122028 A1 | 7/2017 |
| WO | 2018135103 A1 | 7/2018 |

* cited by examiner

MODIFIED BALL VALVE

BACKGROUND OF THE INVENTION

This invention relates to a modified ball valve, and in particular a modified three-way ball valve. The modified ball valve of the present invention has been developed for use in domestic and commercial water heating systems and water-based central heating systems, and will be described herein with reference to such use. However, it is envisaged that the modified ball valve of the present invention will also find use in a wide range of other fluid (liquid or gas) circulation systems, for example in automotive applications, aircraft, boats, air conditioning systems etc.

The applicant's own earlier publications nos. GB 2,561,764 and GB 2,548,204 disclose, respectively, a three-way boiler service and maintenance valve, and a water heating system incorporating the same. The valve has first and second connectors, a separate flush entrance, and a ball valve member having a plurality of apertures and arranged for movement so as selectively to interconnect any two, or all three, of: the first and second connectors and the flush entrance. An access port for a filling loop is also provided, fluid communication with which is permitted when any two of the first and second connectors and the flush entrance are interconnected.

The present invention constitutes a further improvement and adaptation of such a valve. In particular, the present invention seeks to provide a further modified three-way ball valve in which fluid communication with an access port provided on the valve can be enabled in all open and closed positions of the valve.

BRIEF SUMMARY OF THE INVENTION

According to the present invention there is provided a modified valve comprising:
- a body having first, second and third connectors, at least said first and second connectors being adapted for connection to a respective element of a fluid circulation system;
- a ball valve member enclosed internally within the body and arranged for selective rotation between a range of positions; and
- first, second and third apertures provided in the ball valve member and arranged in a configuration so as selectively to permit fluid communication between at least two of said first, second and third connectors in each of said range of positions of the ball valve member;

and wherein:
- the body further comprises a fourth connector; and
- the ball valve member further comprises a conduit to permit fluid communication between said fourth connector and at least two of said first, second and third connectors in each of said range of positions of the ball valve member.

The first, second and third connectors are arranged on the body so as to form a coplanar T-shaped configuration, with the fourth connector being located out of said plane. The first, second and third apertures are similarly arranged on the ball valve member so as to form a corresponding coplanar T-shaped configuration, with the conduit for the fourth connector being located at least partially out of said plane. The first, second and third apertures communicate with one another via an internal cavity provided in the ball valve member. The ball valve member is arranged for rotation of the first, second and third apertures in the shared plane of the first, second and third connectors, so as to align the apertures with the connectors in different combinations thereof, and thereby to define each of the range of positions of the ball valve member. Gasket seals are preferably provided internally of the first, second and third connectors, between said connectors and the ball valve member.

The presence of the fourth connector and the conduit enhance the functionality of the ball valve, thus effectively modifying it from a three-way to a four-way valve.

With reference to the applicant's earlier publications as hereinbefore identified, it should be understood that the flush entrance as described therein effectively corresponds to the third connector as described herein and the access port as described therein effectively corresponds to the fourth connector as described herein.

In one embodiment of modified valve according to the present invention, the conduit comprises a fourth aperture provided in the ball valve member, and arranged to communicate with the first, second and third apertures via the internal cavity of the ball valve member. The fourth aperture is located outside the shared plane of the first, second and third apertures. The fourth aperture can thus remain aligned with the fourth connector whichever of said range of positions the ball valve member is rotated into.

In an alternative embodiment of modified valve according to the present invention, the conduit comprises a channel formed in the outer surface of the ball valve member and in communication with one of said first, second or third apertures. Preferably, the channel extends to said one of said first, second or third apertures from an entry point on the outer surface of the ball valve member located outside the shared plane of the first, second and third apertures. More preferably, the channel extends to the third aperture from an entry point on the outer surface of the ball valve member located generally equidistant from said first, second and third apertures.

As will be appreciated, in this alternative embodiment of modified valve, fluid is permitted to flow over the outer surface of the ball valve member, in addition to the flow of fluid through the internal cavity. This arrangement also lends itself to use of the modified valve in applications where mixing of two fluids is required, for example for cooling, cleaning or water purification. It is further envisaged that the enhanced functionality of the valve may permit one modified valve to be utilised where two conventional valves would previously have been required, thus saving space.

The location of the entry point outside the shared plane of the first, second and third apertures enables said entry point to remain aligned with the fourth connector whichever of said range of positions the ball valve member is rotated into.

In order to facilitate fluid communication between the channel and each of the first, second or third connectors, the gasket seals provided internally of the connectors may preferably be provided with notches adapted for alignment with the channel in each of the range of positions of the ball valve member.

Although not currently a preferred construction of modified valve according to the present invention, it is envisaged that in further alternative embodiments, a plurality of channels may be formed in the outer surface of the ball valve member, extending from the entry point to any two, or all three, of said first, second and third apertures.

The range of positions of the ball valve member preferably comprises:
- a first open position allowing fluid communication between the first connector and the third connector, but not the second connector;

a second open position, allowing fluid communication between the second connector and the third connector, but not the first connector a third open position, allowing fluid communication between all three of the first connector, the second connector, and the third connector and a closed position, allowing fluid communication between the first connector and the second connector, but not the third connector.

The fourth connector may communicate with each of the engaged connectors in each of the above positions, i.e.: the first and third connectors in the first open position; the second and third connectors in the second open position; the first, second and third connectors in the third open position; and the first and second connectors in the closed position.

Communication with the fourth connector may only be required intermittently—as will be the case where the modified valve is utilised in a water heating system and the fourth connector is an access port for a filling loop. The fourth connector may therefore desirably be provided with separate closure means.

Similarly, communication with the third connector may only be required intermittently—as will be the case where the modified valve is utilised in a water heating system and the third connector is a flush entrance. The third connector may therefore desirably be provided with separate closure means, such as a sealing cap.

The valve body may comprise a plurality of faces and is preferably cuboid, having six faces. The first and second connectors are preferably provided on first and second opposed faces. The third connector is preferably provided on a third face, orthogonal to said first and second faces, and having a fourth face opposed thereto. The fourth connector may either be provided on a fifth or sixth face arranged orthogonally to said first, second and third faces. Providing the fourth connector on the fifth or sixth face locates the fourth connector out of the plane of rotation, and thereby enables the conduit to permit fluid communication whichever position the ball valve member is in.

The first and second connectors may be adapted for connection to elements of a water heating system, such as a flow or return pipe connected to a boiler. The third connector may be sealed by a cap, when not required. As will be appreciated from the foregoing, when the ball valve member is in the first or second open positions, fluid communication between the first connector and the second connector is prevented. When the modified valve is installed in a system, sealing the third connector when the ball valve member is in the first or second open positions thus effectively isolates the part of the system connected to the first connector from the part of the system connected to the second connector. This is desirable when wishing to service different elements of the system, as described in the applicant's earlier publications as hereinbefore identified. A pair of modified valves may be installed, one member of said pair being installed in the flow pipe of the system, and the other member of the pair being installed in the return pipe. In other types of fluid circulation system, it may be desirable to install one member of the pair in a hot water feed pipe, and the other member of the pair in a cold water feed pipe. In such applications, the modified valve is particularly beneficial for use in descaling processes.

Movement of the ball valve member from one position to another may be effected by a manually or electrically operated actuator.

In a further development of the present invention, the actuator may be incorporated into one of the connectors, and preferably is incorporated into the third connector. The actuator may thus preferably be formed as a rotatable pipe section connected to said connector and adapted to effect rotation of the ball valve member within the valve body. Rotation of the ball valve member may preferably be effected by the rotatable pipe section engaging with one of the apertures or the conduit of the ball valve member. More preferably, the rotatable pipe section engages with a slot formed at the entry point of the channel constituting the conduit, in embodiments which comprise this feature. The actuator may additionally comprise a rotatable collar provided on said connector and adapted to effect rotation of the rotatable pipe section, and thereby the ball valve member within the valve body.

In such embodiments featuring the incorporation of the actuator into the third connector, and engagement of the rotatable pipe section with the conduit, re-alignment of the ball valve member within the valve body is required, such that the conduit remains aligned with third connector during rotation of the ball valve member.

Incorporating the actuator within one of the connectors frees up an additional face of the valve body, which would otherwise house the actuator. This free space may then be utilised to house a control unit for monitoring and displaying real time data associated with the performance of the fluid circulation system, for example, the flow rate, temperature or pressure of fluid within the system. In applications where the modified valve is utilised for the mixing of two fluids, the control unit may be adapted to measure the flow rate, temperature or pressure of both fluids.

The control unit may be further adapted to transmit the generated real time data wirelessly, for example via WiFi, Bluetooth or cellular signal to a remote receiver. The remote receiver may be a remote computer or cloud server for storage of the data, or may be a remote computer or portable device for real time monitoring of the data, for example by a heating professional where the fluid circulation system is a water heating system. In such applications, the control unit may be further adapted to transmit an alert to the remote receiver when the data generated falls outside pre-set parameters.

BRIEF DESCRIPTION OF THE DRAWINGS

In order that the present invention may be clearly understood, preferred embodiments thereof will now be described in detail, though only by way of example, with reference to the accompanying drawings, in which.

DETAILED DESCRIPTION OF THE INVENTION

Figure 1:
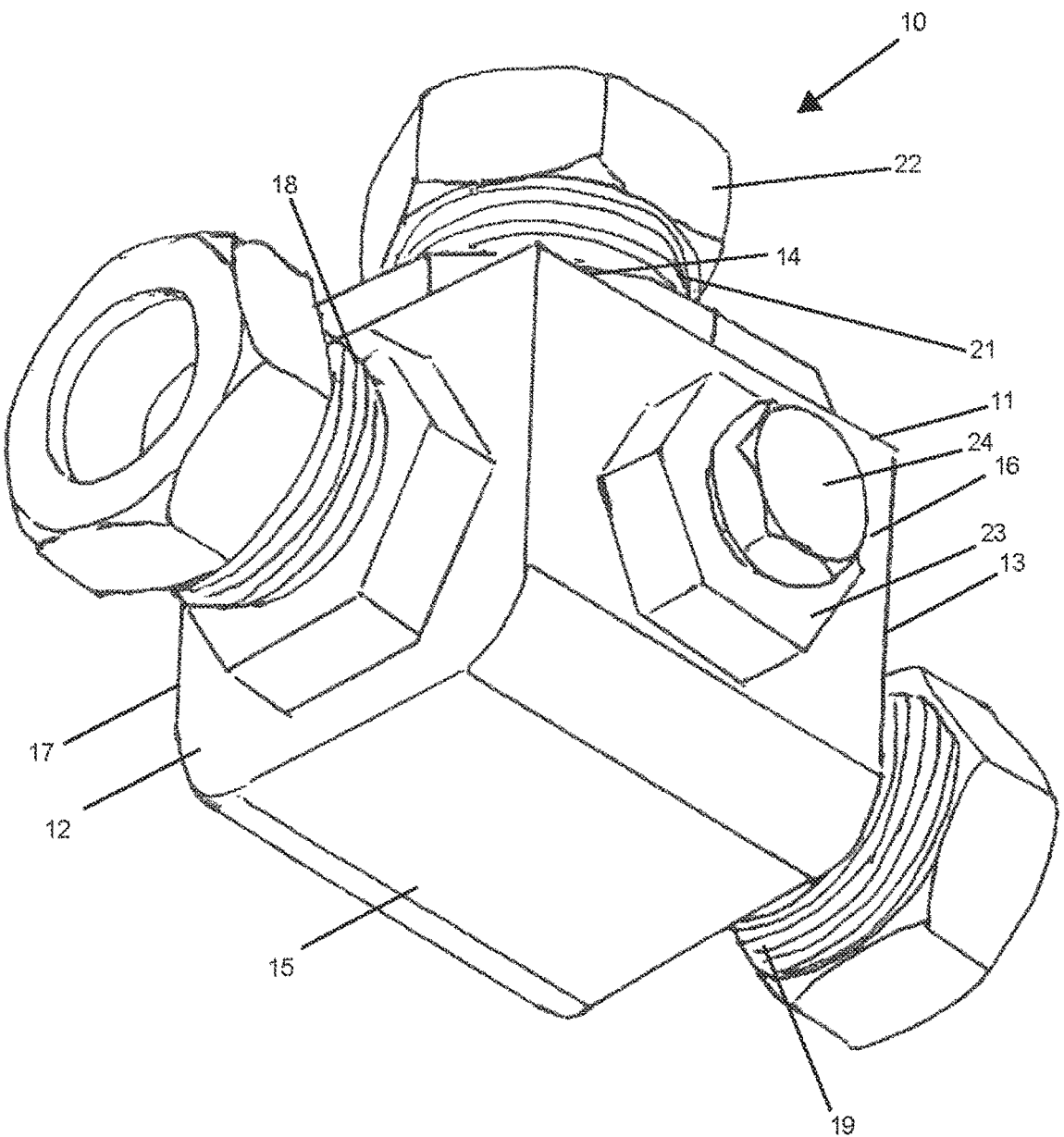
FIG. 1 is a perspective view of a modified valve according to a first embodiment of the present invention.

Referring first to FIG. 1, there is shown a modified valve, generally indicated 10, according to a first embodiment of the present invention. The valve 10 comprises a generally cuboid body 11 having first 12 and second 13 opposed faces, a third face 14 orthogonal to said first 12 and second 13 faces, a fourth face 15 opposed to said third face 14, and fifth 16 and sixth 17 opposed faces, orthogonal to said first 12, second 13, third 14 and fourth 15 faces.

The first face 12 is provided with a first connector 18, and the second face 13 is provided with a second connector 19. Each said connector 18, 19 is adapted for connection to a respective element of a fluid circulation system, such as a flow or return pipe of a water heating system. The third face 14 is provided with a third connector 21 which is similarly adapted for connection to an element of a fluid circulation system, and is additionally provided with a sealing cap 22 to close the connector 21 when not in use. The third connector 21 may be utilised as a flush entrance when the valve 10 is installed in a water heating system. A fourth connector 23 is provided on the fifth face 16 of the body 11, and is similarly provided with a sealing cap 24 to close the fourth connector 23 when not in use. The fourth connector 23 may be utilised as an access port for a filling loop when the valve 10 is installed in a water heating system.

Figure 2:
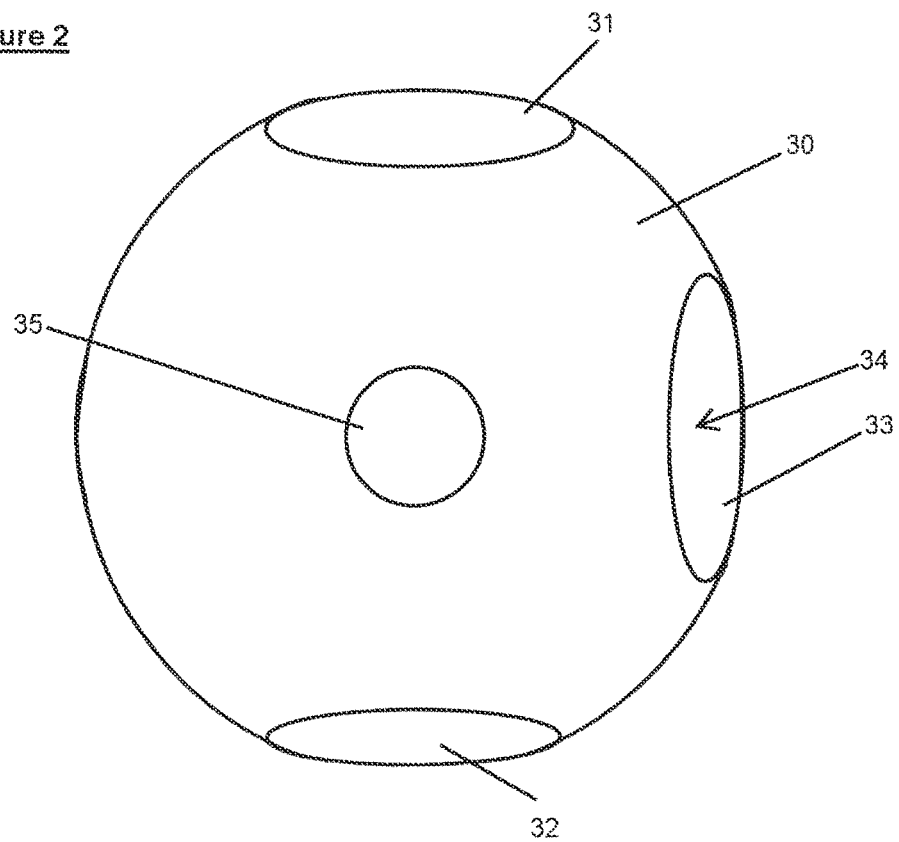
FIG. 2 is a perspective view of a first construction of ball valve member, being a component part of the modified valve of FIG. 1.

Referring now to FIG. 2, there is shown a first construction of ball valve member 30 for use in the valve 10 of FIG. 1. the ball valve member 30 being mounted for rotation internally within the valve body 11. The ball valve member 30 comprises first 31, second 32 and third 33 apertures, arranged in a coplanar, generally T-shaped configuration, and in fluid communication with one another via an internal cavity 34 formed in the ball valve member 30. A fourth aperture 35, also in fluid communication with the internal cavity 34, is located outside the shared plane of the first 31, second 32 and third 33 apertures.

The ball valve member 30 is mounted within the valve body 11 for rotation in the shared plane of the first 31, second 32 and third 33 apertures. The fourth aperture 35 remains in alignment with the fourth connector 23 whilst the ball valve member 30 is rotated so as interchangeably to align the first 31, second 32 and third 33 apertures with the first 18, second 19 and third 21 connectors. This permits fluid communication between any two, or all three, of said first 18, second 19 and third 21 connectors, depending on the rotational position of the ball valve member 30. Fluid communication with the fourth connector 23 is always permitted, regardless of the rotational position of the ball valve member 30.

Figure 3:
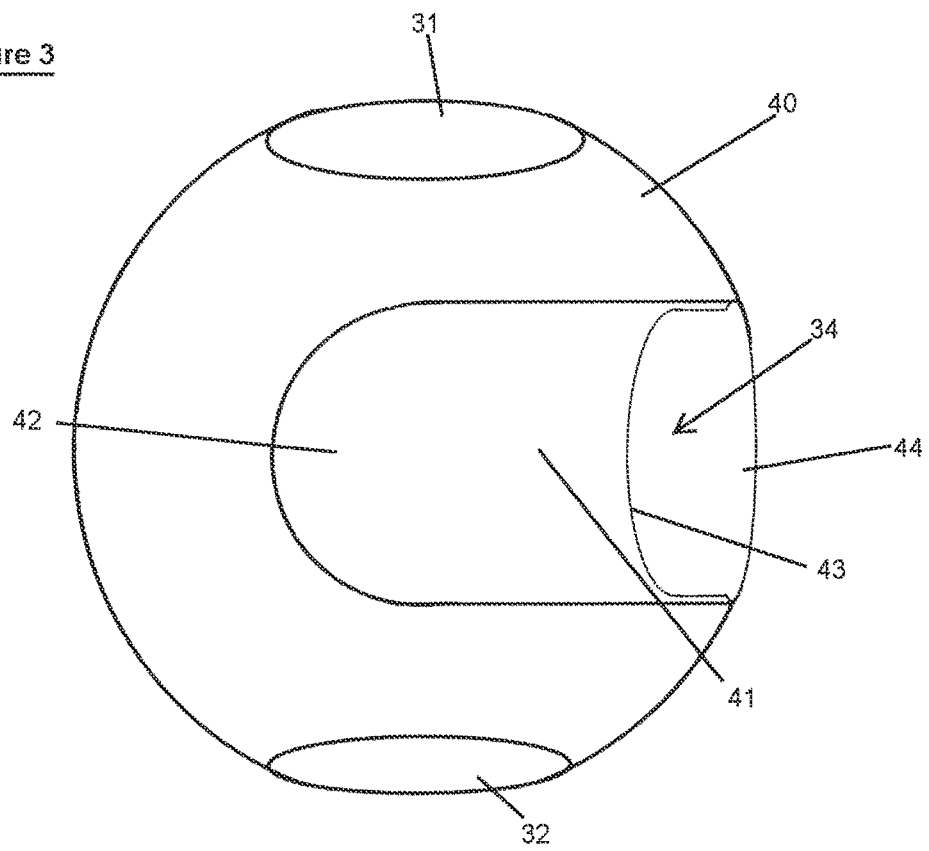
FIG. 3 is a perspective view of an alternative construction of ball valve member, being a component part of the modified valve of FIG. 1.

Referring now to FIG. 3, there is shown an alternative construction of ball valve member 40 for use in the valve 10 of FIG. 1, the ball valve member 40 being mounted for rotation internally within the valve body 11. The ball valve member 40 again comprises first 31 and second 32 apertures, and a modified third aperture 44, arranged in a coplanar, generally T-shaped configuration, and in fluid communication with one another via an internal cavity 34 formed in the ball valve member 40. The third aperture 44 is modified by part of the periphery thereof being stepped in to form a lip 43. The fourth aperture 35 present in the ball valve member 30 of FIG. 2 is now replaced by a channel 41 formed in the surface of the ball valve member 40, and extending from an entry point 42, located outside the shared plane of the first 31, second 32 and third 44 apertures, to the lip 43 forming part of the periphery of the modified third aperture 44. Fluid communication between the entry point 42 and the internal cavity 34 is only permitted via the channel 41 and the modified third aperture 44.

The ball valve member 40 is mounted within the valve body 11 for rotation in the shared plane of the first 31, second 32 and third 44 apertures. The entry point 42 remains in alignment with the fourth connector 23 whilst the ball valve member 30 is rotated so as interchangeably to align the first 31, second 32 and third 44 apertures with the first 18, second 19 and third 21 connectors. This permits fluid communication between any two, or all three, of said first 18, second 19 and third 21 connectors, depending on the rotational position of the ball valve member 40. Fluid communication with the fourth connector 23 is always permitted, regardless of the rotational position of the ball valve member 40.

Figure 4:
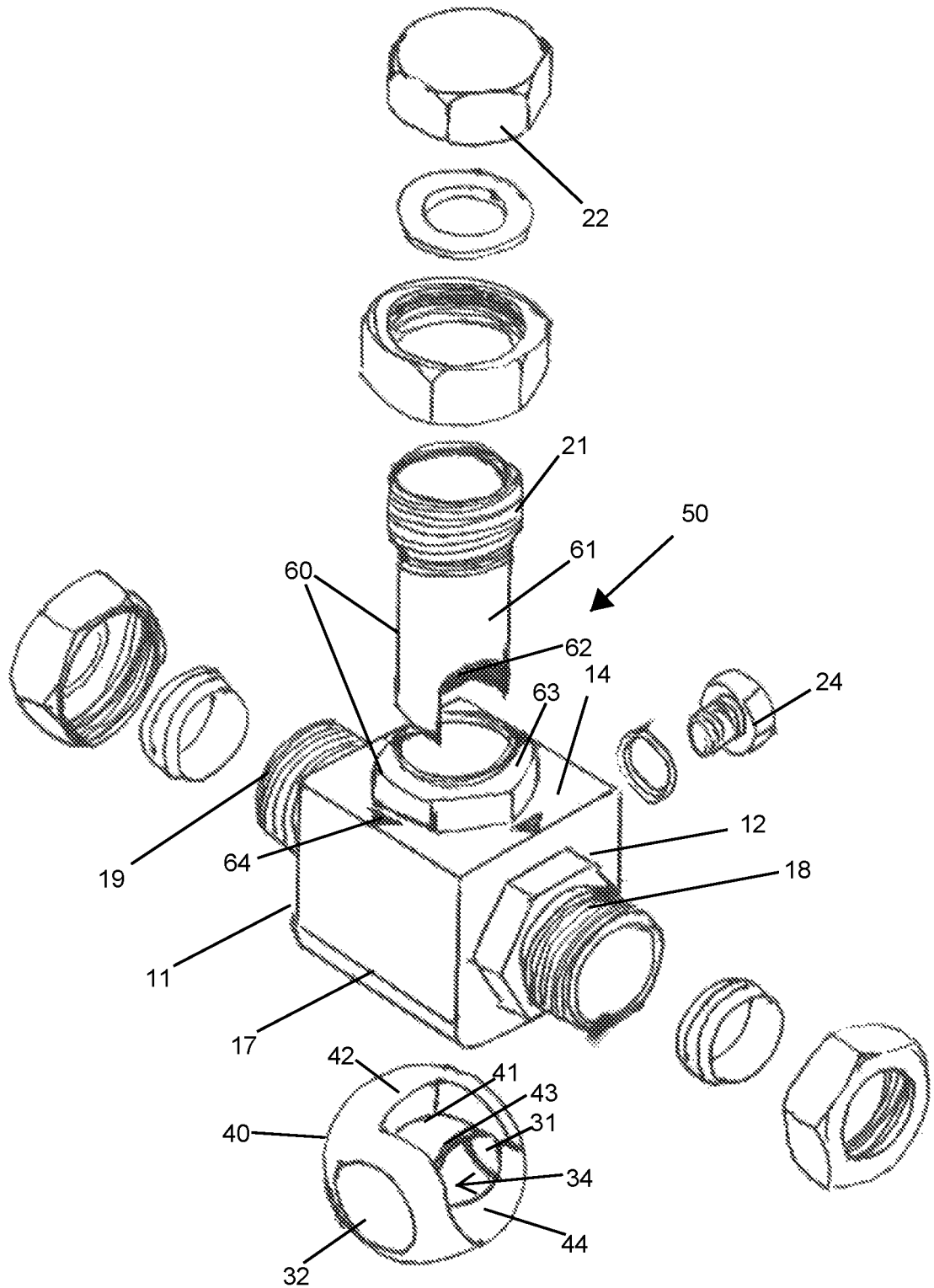
FIG. 4 is an exploded perspective view of a modified valve according to an alternative embodiment of the present invention.

Referring now to FIG. 4, there is shown an exploded view of a modified valve, generally indicated 50, according to an alternative embodiment of the present invention. The principal components of the valve 50 are unchanged from the embodiments described above with reference to FIGS. 1 to 3, and are referenced with like reference numerals. The valve 50 of this embodiment is further modified in that an actuator 60, for effecting rotation of the ball valve member 40 within the valve body 11, is incorporated into the third connector 21.

Figure 5:
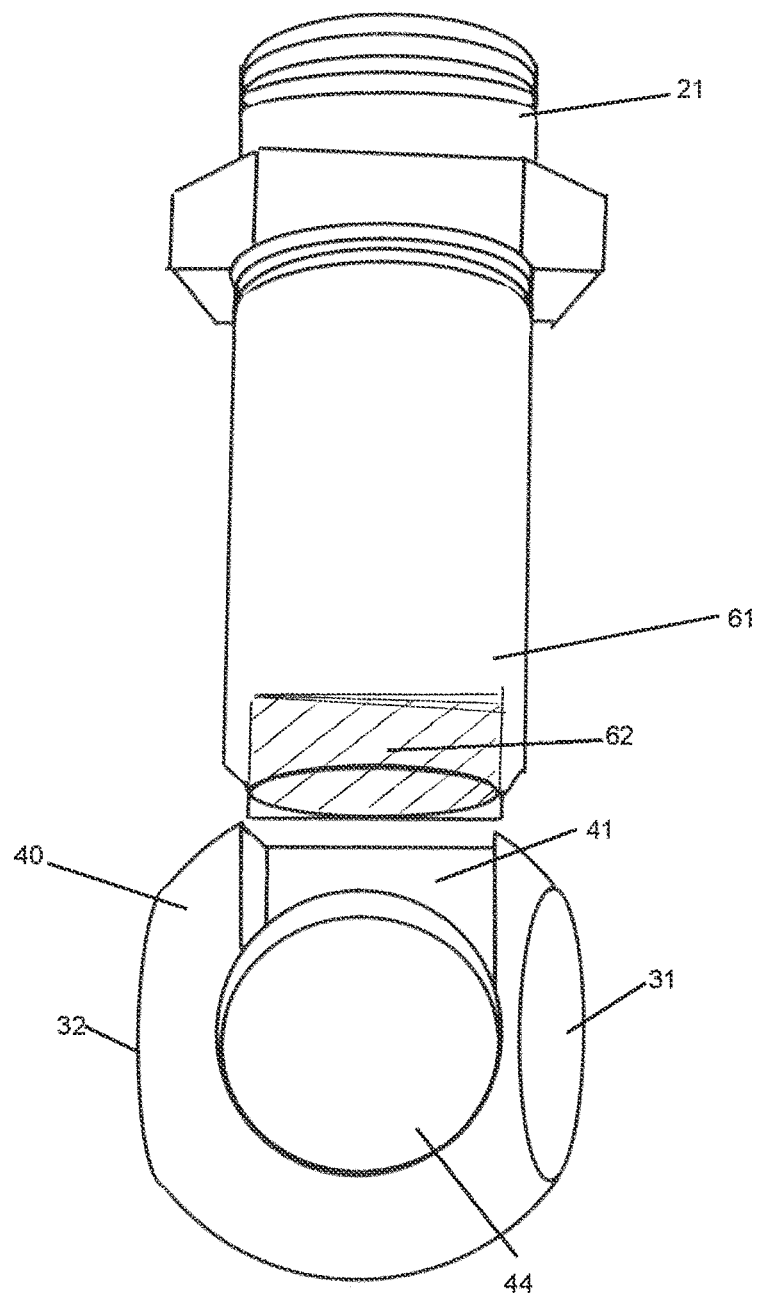
FIG. 5 is a perspective detailed view showing the engagement of a rotatable pipe section and a ball valve member, being component parts of a modified valve according to the embodiment of FIG. 4.

The actuator 60 comprises a rotatable pipe section 61 forming the third connector 21, and adapted to engage with the ball valve member 40, as can best be seen in FIG. 5. The rotatable pipe section 61 is shaped so as to engage with the channel 41 of the ball valve member 40, and comprises a cut-out section 62 to facilitate fluid communication between the rotatable pipe section 61 and the channel 41.

Figure 6:
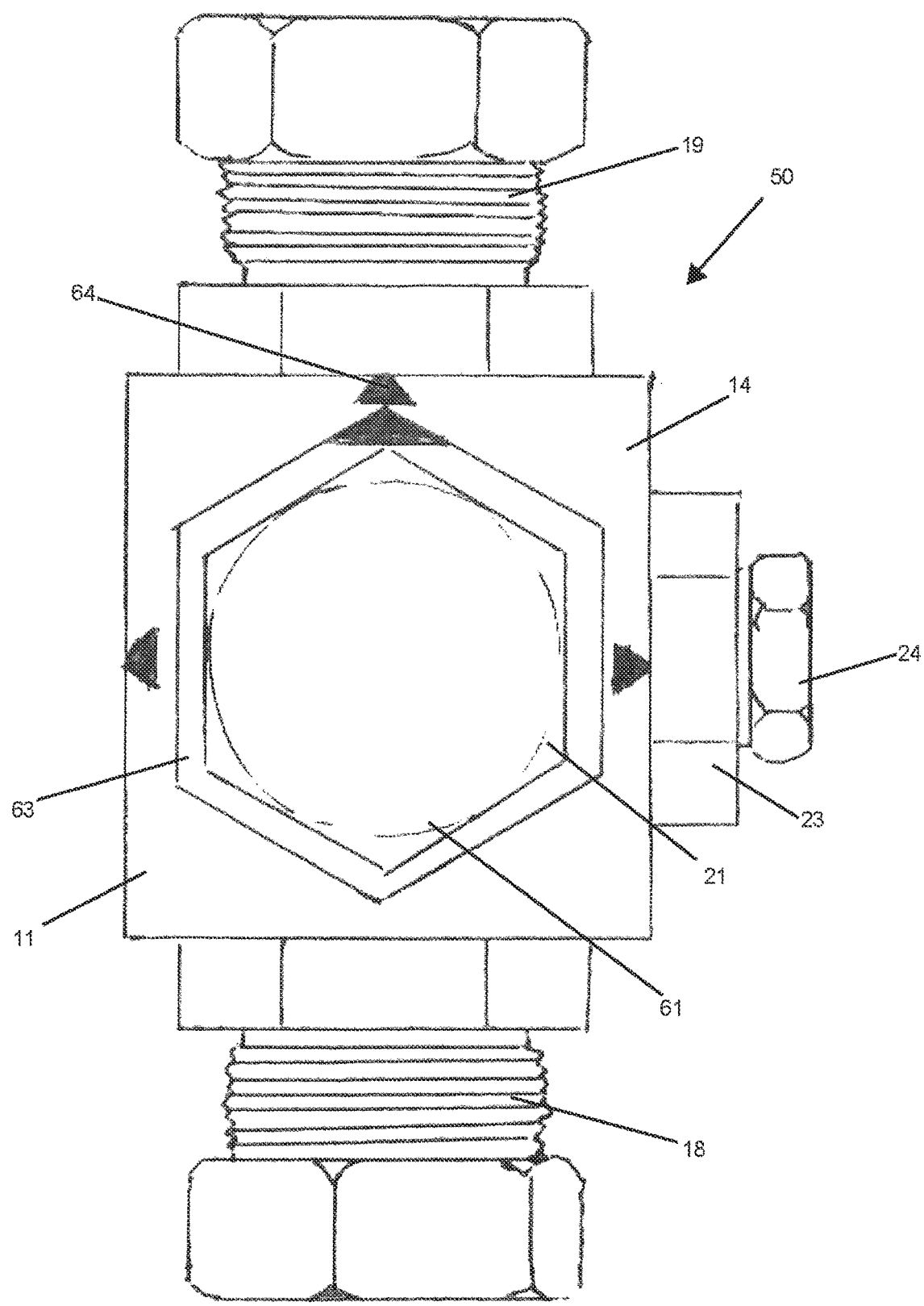
FIG. 6 is a plan view of a modified valve according to the embodiment of FIG. 4.

Referring again to FIG. 4, and as can also be seen in FIG. 6, the pipe section 61 engages with a rotatable collar 63 mounted on the valve body 11 to facilitate operation. The valve body 11 is also provided with markings 64 to assist with correctly aligning the valve 50 during operation.

The alignment of the ball valve member 40 within the valve body 11 is adjusted for this embodiment of valve 50 compared to the valve 10 of FIGS. 1 to 3. The ball valve member 40 is still mounted within the valve body 11 for rotation in the shared plane of the first 31, second 32 and third 44 apertures, however that rotation now interchangeably aligns the first 31, second 32 and third 44 apertures with the first 18, second 19 and fourth 23 connectors. The entry point 42 now remains in alignment with the third connector 21 whilst the ball valve member 40 is rotated. This permits fluid communication between any two, or all three, of said first 18, second 19 and fourth 23 connectors, depending on the rotational position of the ball valve member 40. Fluid communication with the third connector 21 is always permitted regardless of the rotational position of the ball valve member 40.

Figure 7:
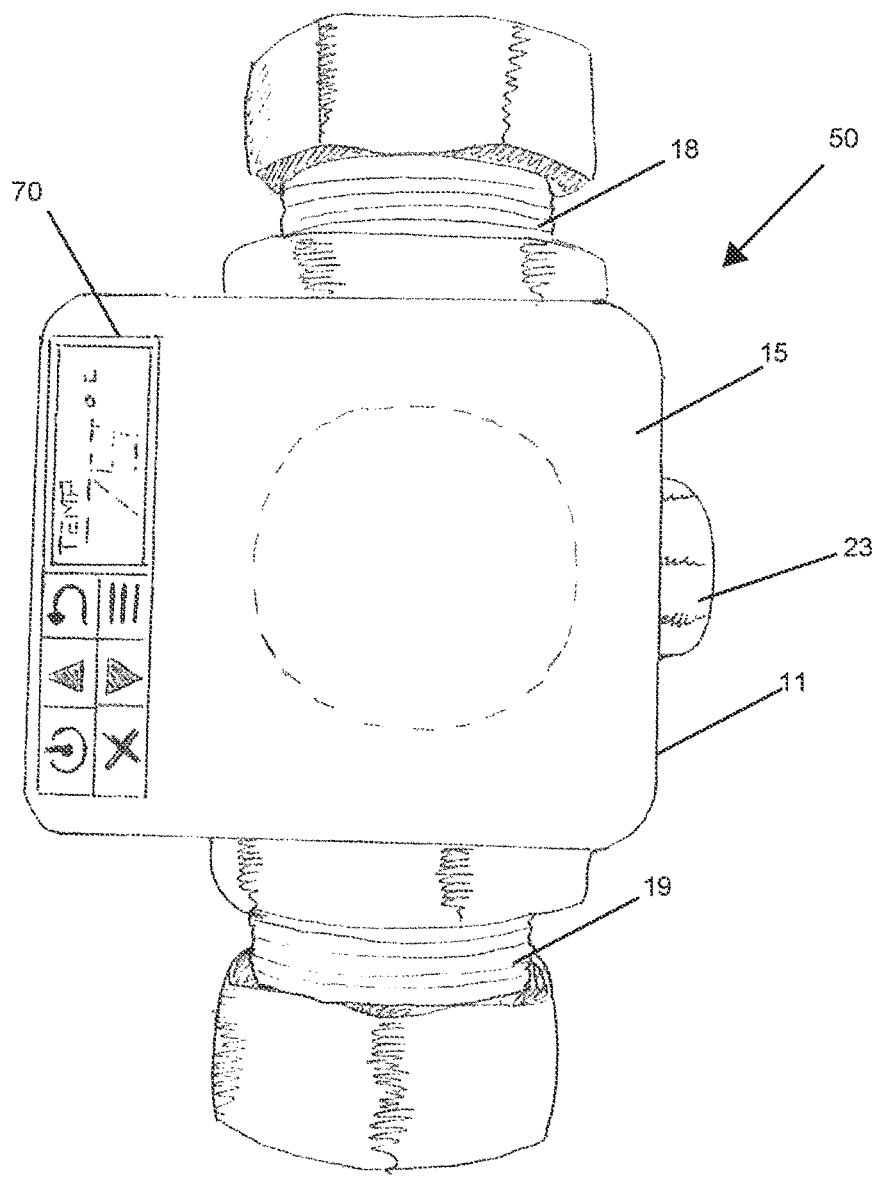
FIG. 7 is a side view of a modified valve according to the embodiment of FIG. 4.

Referring now to FIG. 7, the incorporation of the actuator 60 into the third connector 21 frees up space on the fourth face 15 of the valve body 11, which would in conventional valve arrangements otherwise house the actuator 60. This free space can now be utilised to house a control unit 70 for displaying, for example, the flow rate, temperature or pressure of fluid within the fluid circulation system in which the valve 50 is installed.

The invention claimed is:

1. A valve comprising:
    a body having first and second and third connectors, forming a coplanar, T-shaped configuration, at least said first and second connectors being adapted for connection to a respective element of a fluid circulation system; and
    a ball valve member enclosed internally within the body and having first, second and third apertures forming a corresponding coplanar, T-shaped configuration, and communicating with one another via an internal cavity provided in the ball valve member, said ball valve member being arranged for selective rotation of the first, second and third apertures in a shared plane of the first, second, and third connectors between a range of positions comprising:
        a first open position allowing fluid communication between the first connector and the third connector, but not the second connector;
        a second open position, allowing fluid communication between the second connector and the third connector, but not the first connector;
        a third open position, allowing fluid communication between all of the first connector, the second connector, and the third connector; and
        a closed position, allowing fluid communication between the first connector and the second connector, but not the third connector;
    and wherein:
        the body further comprises a fourth connector; and
        the ball valve member further comprises a conduit comprising a channel formed in and permitting fluid to flow over an outer surface of the ball valve member, thereby bypassing the internal cavity and extending to one of said first, second and third apertures from an entry point on a surface of the ball valve member located outside a shared plane of the first, second and third apertures, to permit fluid communication between said fourth connector and at least two of said first, second and third connectors in each of said range of positions of the ball valve member.

2. The valve of claim 1, wherein the channel extends to the third aperture, and the entry point is located generally equidistant from said first, second and third apertures.

3. The valve of claim 1, wherein:
    when the ball valve member is in the first open position, fluid communication is further allowed between the fourth connector and the first and third connectors, but not the second connector;
    when the ball valve member is in the second open position, fluid communication is further allowed between the fourth connector and the second and third connectors, but not the first connector;
    when the ball valve member is in the third open position, fluid communication is further allowed between the fourth connector and all of the first, second and third connectors; and
    when the ball valve member is in the closed position, fluid communication is further allowed between the fourth connector and the first and second connectors, but not the third connector.

4. The valve of claim 1, wherein at least one of the third and fourth connectors is provided with an independent closure.

5. The valve of claim 1, wherein the body is generally cuboid, and comprises:
    first and second opposed faces, housing the first and second connectors, respectively;
    a third face, orthogonal to said first and second faces, and housing the third connector;
    a fourth face, opposed to said third face; and
    fifth and sixth opposed faces, orthogonal to said third face;
    and wherein the fourth connector is housed in one of said fifth or sixth faces.

6. The valve of claim 1, further comprising a manually or electrically operated actuator arranged to effect motion of the ball valve member from one position to another.

7. The valve of claim 6, wherein the actuator is incorporated into one of the first, second and third connectors.

8. The valve of claim 7, wherein the actuator is formed as a rotatable pipe section connected to one of said first, second and third connectors and adapted to effect rotation of the ball valve member by engaging with the conduit.

9. The valve of claim 8, wherein the actuator further comprises a rotatable collar provided on one of said first, second and third connectors and adapted to effect rotation of said rotatable pipe section and thereby the ball valve member.

10. The valve of claim 7, wherein the actuator is incorporated into the third connector.

11. The valve of claim 7, wherein the actuator is formed as a rotatable pipe section connected to one of said first, second and third connectors and adapted to effect rotation of the ball valve member by engaging with one of the first, second and third apertures thereof.

12. The valve of claim 11, wherein the actuator further comprises a rotatable collar provided on one of said first, second and third connectors and adapted to effect rotation of said rotatable pipe section and thereby the ball valve member.

13. The valve of claim 1, wherein said valve is a boiler service and maintenance valve, the fluid circulation system is a water heating system, the first and second connectors are adapted for connection to flow or return pipes of said water heating system, the third connector is a flush entrance, and the fourth connector is an access port for a filling loop.

* * * * *